US012590624B2

(12) United States Patent
Lin

(10) Patent No.: US 12,590,624 B2
(45) Date of Patent: Mar. 31, 2026

(54) MANUAL SCREW SHAFT DRIVING DEVICE

(71) Applicant: LIN GWO TSAIR ENTERPRISE CO., LTD., Tainan (TW)

(72) Inventor: Yu-Hao Lin, Tainan (TW)

(73) Assignee: LIN GWO TSAIR ENTERPRISE CO., LTD., Tainan (TW)

( * ) Notice: Subject to any disclaimer, the term of this patent is extended or adjusted under 35 U.S.C. 154(b) by 139 days.

(21) Appl. No.: 18/658,180

(22) Filed: May 8, 2024

(65) Prior Publication Data

US 2025/0116316 A1    Apr. 10, 2025

(51) Int. Cl.
*F16H 25/20* (2006.01)
*E06B 9/322* (2006.01)

(52) U.S. Cl.
CPC ......... *F16H 25/2025* (2013.01); *E06B 9/322* (2013.01)

(58) Field of Classification Search
CPC .... E06B 9/322; E06B 2009/3222; E06B 9/78; F16H 2025/2071; F16H 25/20
See application file for complete search history.

(56) References Cited

U.S. PATENT DOCUMENTS 8,205,658 B1 * 6/2012 Lin ........................... E06B 9/40
160/320

* cited by examiner

*Primary Examiner* — Gregory Robert Weber
(74) *Attorney, Agent, or Firm* — Christopher R. Christenson; Kelly, Holt & Christenson, P.L.L.C.

(57) ABSTRACT

Disclosed is manual screw shaft driving device, comprising: a screw shaft, a driving member, a gripping member and a driving direction switching member, wherein the driving member is fitted around the screw shaft in a screw fit manner, the screw shaft is provided passing through a sliding and rotating space inside the gripping member, and the driving member is disposed in the sliding and rotating space, wherein while the driving direction switching member is switched to a first switching position, the screw shaft is driven to rotate only in a first rotation direction by a manual forward and backward sliding operation of the gripping member, and while the driving direction switching member is switched to a second switching position, the screw shaft is driven to rotate only in a second rotation direction by the manual forward and backward sliding operation of the gripping member.

7 Claims, 6 Drawing Sheets

MANUAL SCREW SHAFT DRIVING DEVICE

FIELD OF THE INVENTION

The present invention relates to a screw shaft driving device, and more particularly relates to a manual screw shaft driving device.

BACKGROUND OF THE INVENTION

In buildings, curtains or awnings are used to block sunlight and ultraviolet rays to lower room temperature and provide a cool place. Common operating tools for curtains or awnings include, for example, pull cords and hand cranks, through which the opening and closing or tilting angle of the curtains or awnings can be adjusted.

Among the above-mentioned operating tools, the pull cords have the advantage of simple operation, but have the risk of getting entangled and causing danger. Furthermore, although the hand cranks also have the advantage of simple operation, there is the problem that a conventional hand crank requires an operator to use both hands to operate it.

SUMMARY OF THE INVENTION

Accordingly, one objective of the present invention is to provide a manual screw shaft driving device to solve technical problems in a prior art.

In order to overcome the technical problems in the prior art, the present invention provides a manual screw shaft driving device, comprising: a screw shaft, which is a rod-shaped member extending on an axis, being formed with screw threads around an outer peripheral surface of the screw shaft; a driving member, which has a tubular shape, being formed with driving threads on an internal surface of the driving member, the driving threads being corresponding in shape to the screw threads, wherein the driving member is fitted around the screw shaft in a relatively slidable and rotatable manner by meshing the screw threads with the driving threads, and the driving member is further formed with a front engaging portion at a front end of the driving member, a rear engaging portion at a rear end of the driving member, and a protruding portion protruding from an external surface of the driving member; a gripping member, which has a tubular shape, being formed with a sliding and rotating space inside the gripping member, wherein the screw shaft is provided passing through the sliding and rotating space in a manner that the screw shaft is slidable and rotatable with respect to the gripping member, the driving member is disposed in the sliding and rotating space in a relatively slidable and rotatable manner, and the gripping member is further formed with a front stop-rotation portion at an inner front end of the gripping member, the shape of the front stop-rotation portion is formed corresponding to the front engaging portion, an inner rear end of the gripping member is formed with a rear stop-rotation portion whose shape is corresponding to the rear engaging portion, and a peripheral side wall of the gripping member is formed with an opening communicating with the sliding and rotating space; and a driving direction switching member disposed at the opening of the gripping member in a slidable manner along the axis to switch between a first switching position and a second switching position, the driving direction switching member being formed protruding into the sliding and rotating space with a front limiting portion and a rear limiting portion behind the front limiting portion to define a sliding limitation space between the front limiting portion and the rear limiting portion, wherein the protruding portion protrudes into the sliding limitation space such that forward and backward sliding of the driving member in the sliding and rotating space is limited, wherein while the driving direction switching member is switched to the first switching position, operating conditions include: (1) when the gripping member slides backwardly with respect to the screw shaft, the front stop-rotation portion of the gripping member backwardly engages the front engaging portion of the driving member, rendering the driving member unable to rotate to cause the driving member is unable to rotate with respect to the gripping member, and therefore the screw shaft is driven to rotate in a first rotation direction with respect to the gripping member by a screw mechanism between the screw threads and the driving threads of the driving member, and (2) when the gripping member slides forwardly with respect to the screw shaft, the front stop-rotation portion of the gripping member forwardly disengages from the front engaging portion of the driving member, and the rear engaging portion of the driving member is spaced apart from the rear stop-rotation portion of the gripping member by means of a rear limitation of the rear limiting portion of the driving direction switching member to the protruding portion, rendering the driving member rotatable, and therefore the driving member rotates with respect to the screw shaft but does not drive the screw shaft to rotate, the above two operating conditions enable the screw shaft to rotate only in the first rotation direction by a manual forward and backward sliding operation of the gripping member, wherein while the driving direction switching member is switched to the second switching position, operating conditions include: (1) when the gripping member slides forwardly with respect to the screw shaft, the rear stop-rotation portion of the gripping member forwardly engages the rear engaging portion of the driving member, rendering the driving member unable to rotate to cause the driving member is unable to rotate with respect to the gripping member, and therefore the screw shaft is driven to rotate in a second rotation direction, which is opposite to the first rotating direction, with respect to the gripping member by the screw mechanism between the screw threads and the driving threads of the driving member, and (2) when the gripping member slides backwardly with respect to the screw shaft, the rear stop-rotation portion of the gripping member backwardly disengages from the rear engaging portion of the driving member, and the front engaging portion of the driving member is spaced apart from the front stop-rotation portion of the gripping member by means of a front limitation of the front limiting portion of the driving direction switching member to the protruding portion, rendering the driving member rotatable, and therefore the driving member rotates with respect to the screw shaft but does not drive the screw shaft to rotate, the above two operating conditions enable the screw shaft to rotate only in the second rotation direction by the manual forward and backward sliding operation of the gripping member.

In one embodiment of the present invention, the manual screw shaft driving device is provided, wherein the front engaging portion has front engaging ratchet teeth, and the front stop-rotation portion has front stop-rotation ratchet teeth, wherein the driving member is provided to be unable to rotate in the first rotation direction when the front engaging ratchet teeth and the front stop-rotation ratchet teeth are engaged.

In one embodiment of the present invention, the manual screw shaft driving device is provided, wherein the rear engaging portion has rear engaging ratchet teeth, and the rear stop-rotation portion has rear stop-rotation ratchet teeth, wherein the driving member is provided in a manner unable to rotate in the second rotation direction when the rear engaging ratchet teeth and the rear stop-rotation ratchet teeth are engaged.

In one embodiment of the present invention, the manual screw shaft driving device is provided, wherein the protruding portion is formed around the external surface of the driving member.

In one embodiment of the present invention, the manual screw shaft driving device is provided, wherein an outer front end of the gripping member is provided with a front holding portion and an outer rear end of the gripping member is provided with a rear holding portion, wherein the front holding portion and the rear holding portion have through holes formed coaxially along the axis, and the screw shaft is held by the through holes of the front holding portion and the rear holding portion to pass through the sliding and rotating space.

In one embodiment of the present invention, the manual screw shaft driving device is provided, wherein a rear end of the screw shaft is provided with a flange portion protruding from the outer peripheral surface of the screw shaft in a direction perpendicular to the axis, and when the gripping member slides backwardly with respect to the screw shaft, the screw shaft is prevented from coming off from the gripping member by the flange portion forwardly pressing against the gripping member.

In one embodiment of the present invention, the manual screw shaft driving device is provided, wherein an outer surface of the driving direction switching member is formed with a plurality of non-slip grooves.

With the technical means adopted by the present invention, the manual screw shaft driving device enables the screw shaft to rotate only in a desired rotation direction by switching the driving direction switching member between the first switching position and the second switching position. Furthermore, the manual screw shaft driving device of the present invention enables an operator to perform the manual forward and backward sliding operation and switching of rotation direction of the screw shaft with one hand. Moreover, the manual screw shaft driving device of the present invention enables the operator to rotate the screw shaft only in the desired rotation direction by the changeless manual forward and backward sliding operation using only one hand so that the opening and closing or tilting angle of the curtains or awnings can be adjusted by only one hand.

DETAILED DESCRIPTION OF THE PREFERRED EMBODIMENTS

Figure 1:
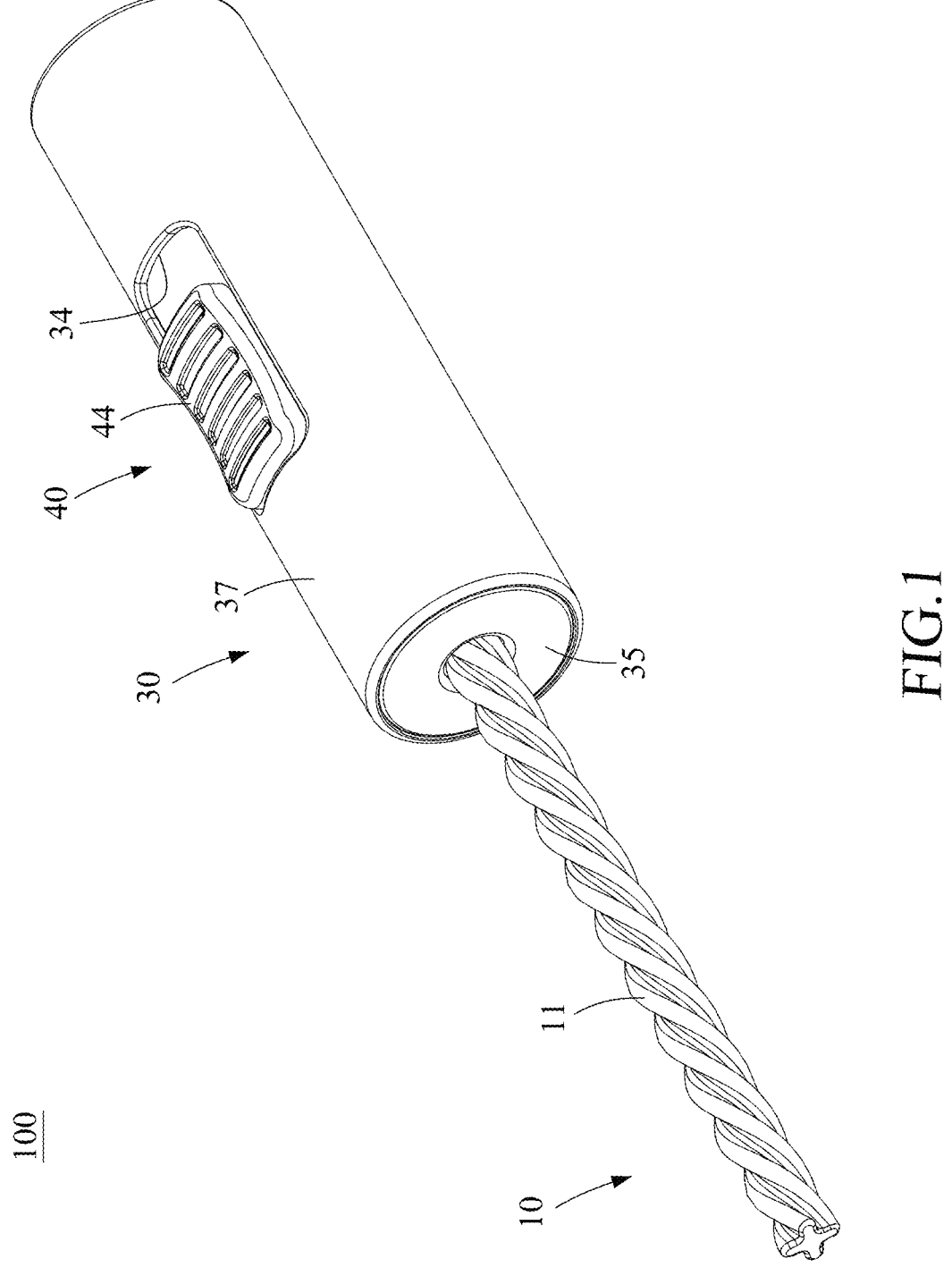
FIG. 1 is a schematic perspective view illustrating a manual screw shaft driving device according to one embodiment of the present invention.

The preferred embodiments of the present invention are described in detail with reference to FIG. 1 to FIG. 6. The description is used for explaining the embodiments of the present invention only, but not for limiting the scope of the claims.

As shown in FIG. 1 to FIG. 6, a manual screw shaft driving device 100 according to one embodiment of the present invention comprises a screw shaft 10, a driving member 20, a gripping member 30 and a driving direction switching member 40.

Specifically, the screw shaft 10 of the manual screw shaft driving device 100 according to the embodiment of the present invention, which is a rod-shaped member extending on an axis, is formed with screw threads 11 around an outer peripheral surface of the screw shaft 10.

As shown in FIG. 1 to FIG. 6, the driving member 20 of the manual screw shaft driving device 100 according to the embodiment of the present invention has a tubular shape. Specifically, the driving member 20 is a tubular member. Certainly, the present invention is not limited to this embodiment, and the driving member 20 may be a tubular member of any shape as long as the driving member 20 is disposed in a sliding and rotating space 31 (described below) in a relatively slidable and rotatable manner.

Specifically, as shown in FIG. 3 to FIG. 6, the driving member 20 is formed with driving threads 21 on an internal surface of the driving member 20, the driving threads 21 are corresponding in shape to the screw threads 11, and the driving member 20 is fitted around the screw shaft 10 in a relatively slidable and rotatable manner by meshing the screw threads 11 with the driving threads 21.

Furthermore, as shown in FIG. 2 to FIG. 6, in the driving member 20 of the manual screw shaft driving device 100 according to the embodiment of the present invention, the driving member 20 is further formed with a front engaging portion 22 at a front end of the driving member 20, a rear engaging portion 23 at a rear end of the driving member 20, and a protruding portion 24 protruding from an external surface of the driving member 20.

As shown in FIG. 1 to FIG. 6, the gripping member 30 of the manual screw shaft driving device 100 according to the embodiment of the present invention, which has a tubular shape, is formed with the sliding and rotating space 31 inside the gripping member 30, wherein the screw shaft 10 is provided passing through the sliding and rotating space 31 in a manner that the screw shaft 10 is slidable and rotatable with respect to the gripping member 30. Specifically, in this embodiment, the gripping member 30 is a tubular member. Certainly, the present invention is not limited to this embodiment, and the gripping member 30 may be a tubular member of any shape as long as the gripping member 30 is capable of being held by an operator for performing a manual forward and backward sliding operation.

Furthermore, as shown in FIG. 2 to FIG. 6, the gripping member 30 is further formed with a front stop-rotation portion 32 at an inner front end of the gripping member 30, the shape of the front stop-rotation portion 32 is formed corresponding to the front engaging portion 22, an inner rear end of the gripping member 30 is formed with a rear stop-rotation portion 33 whose shape is corresponding to the rear engaging portion 23, and a peripheral side wall of the gripping member 30 is formed with an opening 34 communicating with the sliding and rotating space 31.

As shown in FIG. 1 to FIG. 6, the driving direction switching member 40 of the manual screw shaft driving device 100 according to the embodiment of the present invention is disposed at the opening 34 of the gripping member 30 in a slidable manner along the axis to switch between a first switching position and a second switching position.

As shown in FIG. 3 to FIG. 6, the driving direction switching member 40 is formed protruding into the sliding and rotating space 31 with a front limiting portion 42 and a rear limiting portion 43 behind the front limiting portion 42 to define a sliding limitation space 41 between the front limiting portion 42 and the rear limiting portion 43, wherein the protruding portion 24 protruding from the external surface of the driving member 20 protrudes into the sliding limitation space 41 such that forward and backward sliding of the driving member 20 in the sliding and rotating space 31 is limited.

Operating conditions of the manual screw shaft driving device 100 according to the embodiment of the present invention will be described below with reference to FIG. 3 to FIG. 6.

Figure 3:
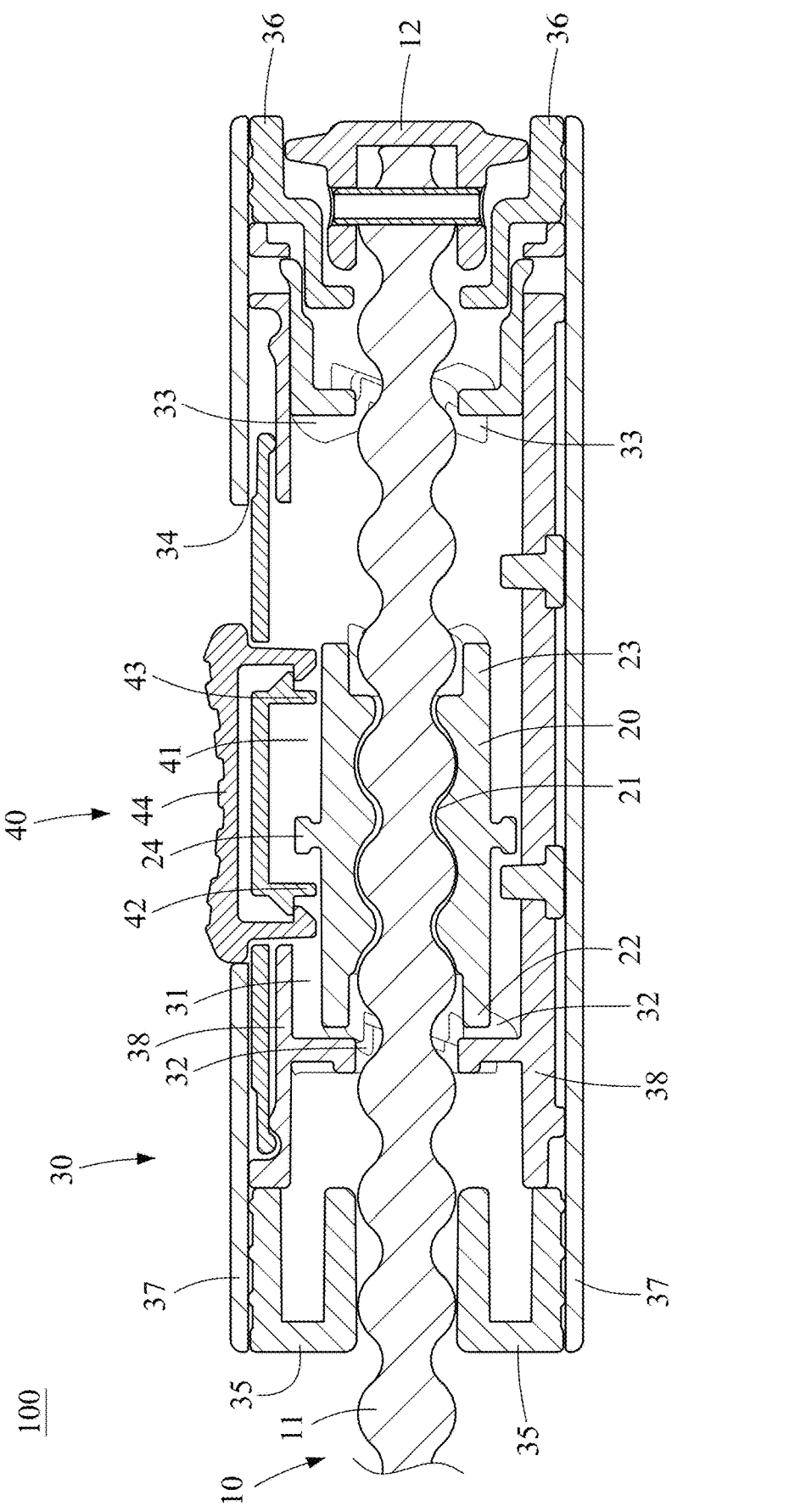
FIG. 3 is a schematic cross-section view of the manual screw shaft driving device according to the embodiment of the present invention, wherein a driving direction switching member is in a first switching position and a gripping member slides backwardly with respect to a screw shaft.
Figure 4:
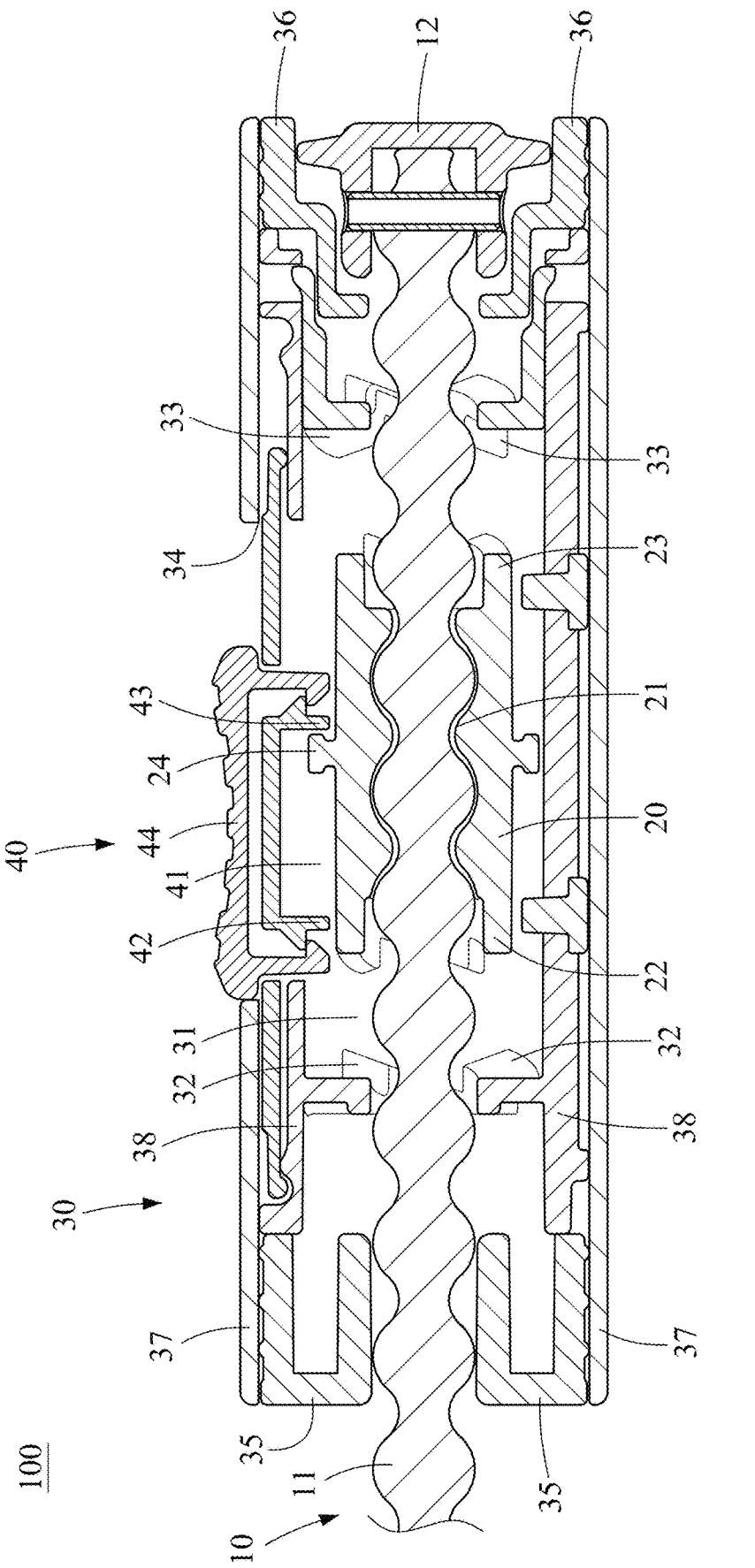
FIG. 4 is a schematic cross-section view of the manual screw shaft driving device according to the embodiment of the present invention, wherein the driving direction switching member is in the first switching position and the gripping member slides forwardly with respect to the screw shaft.

First, the operating conditions while the driving direction switching member 40 is in the first switching position are described. FIG. 3 and FIG. 4 are schematic cross-section view of the manual screw shaft driving device 100 according to the embodiment of the present invention, wherein the driving direction switching member 40 is in the first switching position.

As shown in FIG. 3, while the driving direction switching member 40 is switched to the first switching position, when the gripping member 30 slides backwardly with respect to the screw shaft 10, the front stop-rotation portion 32 of the gripping member 30 backwardly engages the front engaging portion 22 of the driving member 20, rendering the driving member 20 unable to rotate to cause the driving member 20 is unable to rotate with respect to the gripping member 30, and therefore the screw shaft 10 is driven to rotate in a first rotation direction with respect to the gripping member 30 by a screw mechanism between the screw threads 11 and the driving threads 21 of the driving member 20.

As shown in FIG. 4, while the driving direction switching member 40 is switched to the first switching position, when the gripping member 30 slides forwardly with respect to the screw shaft 10, the front stop-rotation portion 32 of the gripping member 30 forwardly disengages from the front engaging portion 22 of the driving member 20, and the rear engaging portion 23 of the driving member 20 is spaced apart from the rear stop-rotation portion 33 of the gripping member 30 by means of a rear limitation of the rear limiting portion 43 of the driving direction switching member 40 to the protruding portion 24 of the driving member 20, rendering the driving member 20 rotatable, and therefore the driving member 20 rotates with respect to the screw shaft 10 but does not drive the screw shaft 10 to rotate.

Therefore, when the driving direction switching member 40 is switched to the first switching position, the above two operating conditions enable the screw shaft 10 to rotate only in the first rotation direction by a manual forward and backward sliding operation of the gripping member 30.

Figure 5:
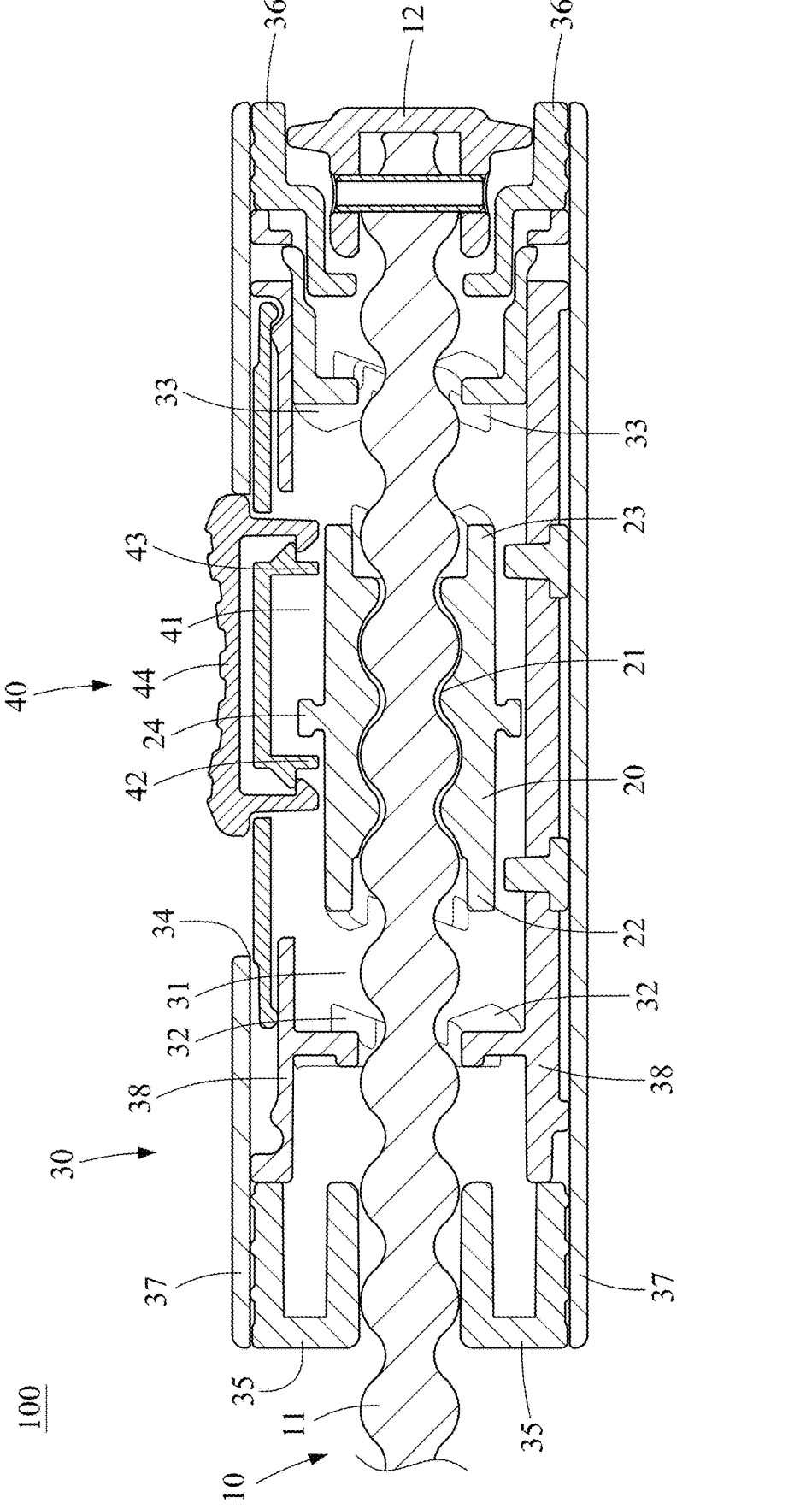
FIG. 5 is a schematic cross-section view of the manual screw shaft driving device according to the embodiment of the present invention, wherein the driving direction switching member is in a second switching position and the gripping member slides forwardly with respect to the screw shaft.
Figure 6:
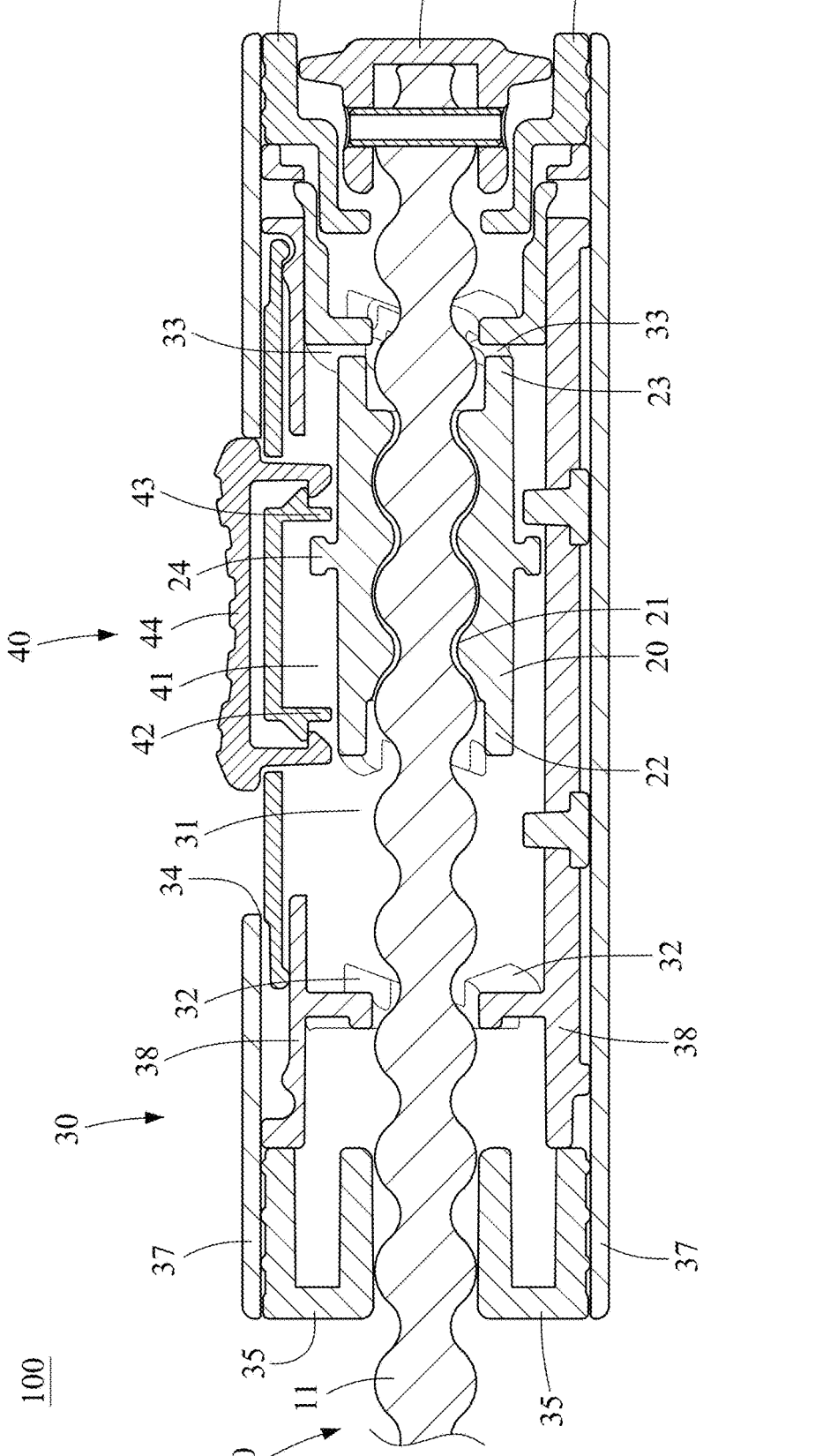
FIG. 6 is a schematic cross-section view of the manual screw shaft driving device according to the embodiment of the present invention, wherein the driving direction switching member is in the second switching position and the gripping member slides backwardly with respect to the screw shaft.

Next, the operating conditions while the driving direction switching member 40 is in the second switching position are described. FIG. 5 and FIG. 6 are schematic cross-section views of the manual screw shaft driving device 100 according to the embodiment of the present invention, wherein the driving direction switching member 40 is in the first switching position.

As shown in FIG. 5, while the driving direction switching member 40 is switched to the second switching position, when the gripping member 30 slides forwardly with respect to the screw shaft 10, the rear stop-rotation portion 33 of the gripping member 30 forwardly engages the rear engaging portion 23 of the driving member 20, rendering the driving member 20 unable to rotate to cause the driving member 20 is unable to rotate with respect to the gripping member 30, and therefore the screw shaft 10 is driven to rotate in a second rotation direction, which is opposite to the first rotating direction, with respect to the gripping member 30 by the screw mechanism between the screw threads 11 and the driving threads 21 of the driving member 20.

As shown in FIG. 6, while the driving direction switching member 40 is switched to the second switching position, when the gripping member 30 slides backwardly with respect to the screw shaft 10, the rear stop-rotation portion 33 of the gripping member 30 backwardly disengages from the rear engaging portion 23 of the driving member 20, and the front engaging portion 22 of the driving member 20 is spaced apart from the front stop-rotation portion 32 of the gripping member 30 by means of a front limitation of the front limiting portion 42 of the driving direction switching member 40 to the protruding portion 24 of the driving member 20, rendering the driving member 20 rotatable, and therefore the driving member 20 rotates with respect to the screw shaft 10 but does not drive the screw shaft 10 to rotate.

Therefore, when the driving direction switching member 40 is switched to the second switching position, the above two operating conditions enable the screw shaft 10 to rotate only in the second rotation direction by the manual forward and backward sliding operation of the gripping member 30.

In detail, as shown in FIG. 2 to FIG. 6, in the manual screw shaft driving device 100 according to the embodiment of the present invention, the front engaging portion 22 has front engaging ratchet teeth, and the front stop-rotation portion 32 has front stop-rotation ratchet teeth, wherein the driving member 20 is provided to be unable to rotate in the first rotation direction when the front engaging ratchet teeth and the front stop-rotation ratchet teeth are engaged.

Furthermore, as shown in FIG. 2 to FIG. 6, in the manual screw shaft driving device 100 according to the embodiment of the present invention, the rear engaging portion 23 has rear engaging ratchet teeth, and the rear stop-rotation portion 33 has rear stop-rotation ratchet teeth, wherein the driving member 20 is provided in a manner unable to rotate in the second rotation direction when the rear engaging ratchet teeth and the rear stop-rotation ratchet teeth are engaged.

Therefore, while the driving direction switching member 40 is switched to the first switching position, when the front stop-rotation portion 32 of the gripping member 30 backwardly engages the front engaging portion 22 of the driving member 20, since the front engaging ratchet teeth of the front engaging portion 22 and the front stop-rotation ratchet teeth of the front stop-rotation portion 32 are engaged, the driving member 20 is unable to rotate in the first rotation direction. When the front stop-rotation portion 32 of the gripping member 30 forwardly disengages from the front engaging portion 22 of the driving member 20, since the front engaging ratchet teeth of the front engaging portion 22 and the front stop-rotation ratchet teeth of the front stop-rotation portion 32 are not engaged and the rear engaging portion 23 of the driving member 20 is spaced apart from the rear stop-rotation portion 33 of the gripping member 30 such that the rear engaging ratchet teeth of the rear engaging portion 23 and the rear stop-rotation ratchet teeth of the rear stop-rotation portion 33 are also not engaged, the driving member 20 is rotatable.

Furthermore, while the driving direction switching member 40 is switched to the second switching position, when the rear stop-rotation portion 33 of the gripping member 30 forwardly engages the rear engaging portion 23 of the driving member 20, since the rear engaging ratchet teeth of the rear engaging portion 23 and the rear stop-rotation ratchet teeth of the rear stop-rotation portion 33 are engaged, the driving member 20 is unable to rotate in the second rotation direction. When the rear stop-rotation portion 33 of the gripping member 30 backwardly disengages from the rear engaging portion 23 of the driving member 20, since the rear engaging ratchet teeth of the rear engaging portion 23 and the rear stop-rotation ratchet teeth of the rear stop-rotation portion 33 are not engaged and the front engaging portion 22 of the driving member 20 is spaced apart from the front stop-rotation portion 32 of the gripping member 30 such that the front engaging ratchet teeth of the front engaging portion 22 and the front stop-rotation ratchet teeth of the front stop-rotation portion 32 are also not engaged, the driving member 20 is rotatable.

Figure 2:
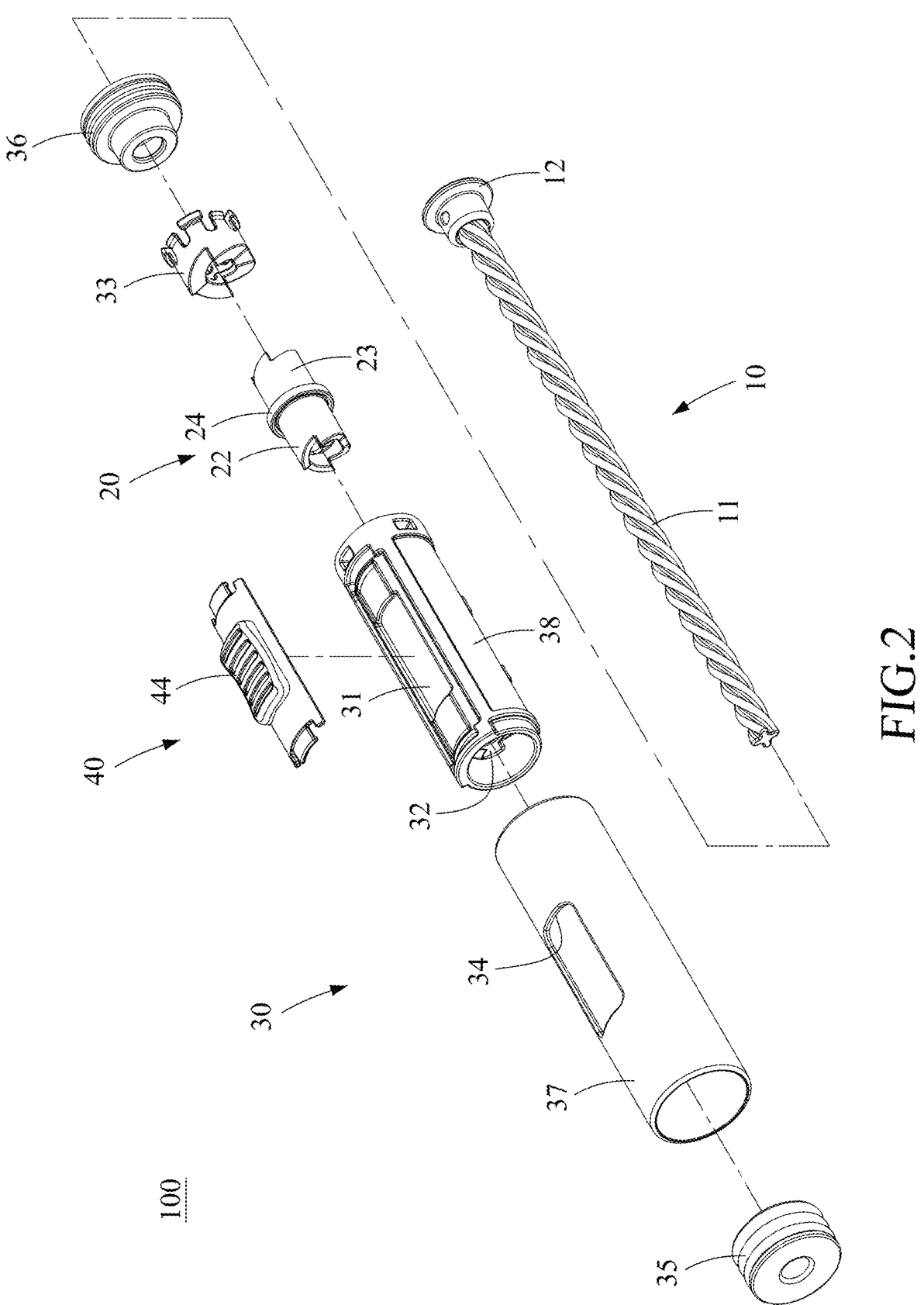
FIG. 2 is a schematic exploded view illustrating the manual screw shaft driving device according to the embodiment of the present invention.

In addition, as shown in FIG. 2, in the manual screw shaft driving device 100 according to the embodiment of the present invention, the protruding portion 24 is formed around the external surface of the driving member 20. In this way, no matter what posture the driving member 20 rotates to, the protruding portion 24 can be reliably limited by the front limiting portion 42 or the rear limiting portion 43 of the driving direction switching member 40.

Furthermore, as shown in FIG. 2 and FIG. 4 to FIG. 7, in the manual screw shaft driving device 100 according to the embodiment of the present invention, an outer front end of the gripping member 30 is provided with a front holding portion 35 and an outer rear end of the gripping member is provided with a rear holding portion 36, wherein the front holding portion 35 and the rear holding portion 36 have through holes formed coaxially along the axis, and the screw shaft 10 is held by the through holes of the front holding portion 35 and the rear holding portion 36 to pass through the sliding and rotating space 31.

Furthermore, as shown in FIG. 2 and FIG. 4 to FIG. 7, in the manual screw shaft driving device 100 according to the embodiment of the present invention, a rear end of the screw shaft 10 is provided with a flange portion 12 protruding from the outer peripheral surface of the screw shaft 10 in a direction perpendicular to the axis, and when the gripping member 30 slides backwardly with respect to the screw shaft 10, the screw shaft 10 is prevented from coming off from the gripping member 30 by the flange portion 12 forwardly pressing against the gripping member 30.

Furthermore, as shown in FIG. 1, FIG. 2 and FIG. 4 to FIG. 7, in the manual screw shaft driving device 100 according to the embodiment of the present invention, an outer surface of the driving direction switching member 40 is formed with a plurality of non-slip grooves 44, which enables an operator to reliably switch the driving direction switching member 40 between the first switching position and the second switching position.

Furthermore, as shown in FIG. 2 and FIG. 4 to FIG. 7, in the manual screw shaft driving device 100 according to the embodiment of the present invention, the gripping member 30 includes an inner tubular portion 38 and an outer tubular portion 37 fitted around the inner tubular portion 38. In this embodiment, the front stop-rotation portion 32 is formed at a front end of the inner tubular portion 38. In this way, the manual screw shaft driving device 100 can be easily assembled.

With the technical means adopted by the present invention, the manual screw shaft driving device 100 enables the screw shaft 10 to rotate only in the first rotation direction by the manual forward and backward sliding operation while the driving direction switching member 40 is switched to the first switching position and to rotate only in the second rotation direction by the manual forward and backward sliding operation while the driving direction switching member 40 is switched to the second switching position, thereby enabling the screw shaft 10 to rotate only in a desired rotation direction. Furthermore, the manual screw shaft driving device 100 of the present invention enables the operator to perform the manual forward and backward sliding operation and switching of rotation direction of the screw shaft 10 with one hand. Moreover, the manual screw shaft driving device 100 of the present invention enables the operator to adjust the opening and closing or tilting angle of curtains or awnings by performing the changeless manual forward and backward sliding operation.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A manual screw shaft driving device, comprising:
   a screw shaft, which is a rod-shaped member extending on an axis, being formed with screw threads around an outer peripheral surface of the screw shaft;
   a driving member, which has a tubular shape, being formed with driving threads on an internal surface of the driving member, the driving threads being corresponding in shape to the screw threads, wherein the driving member is fitted around the screw shaft in a relatively slidable and rotatable manner by meshing the screw threads with the driving threads, and the driving member is further formed with a front engaging portion at a front end of the driving member, a rear engaging portion at a rear end of the driving member, and a protruding portion protruding from an external surface of the driving member;
   a gripping member, which has a tubular shape, being formed with a sliding and rotating space inside the gripping member, wherein the screw shaft is provided passing through the sliding and rotating space in a manner that the screw shaft is slidable and rotatable with respect to the gripping member, the driving member is disposed in the sliding and rotating space in a relatively slidable and rotatable manner, and the gripping member is further formed with a front stop-rotation portion at an inner front end of the gripping member, the shape of the front stop-rotation portion is formed corresponding to the front engaging portion, an inner rear end of the gripping member is formed with a rear stop-rotation portion whose shape is corresponding to the rear engaging portion, and a peripheral side wall of the gripping member is formed with an opening communicating with the sliding and rotating space; and a driving direction switching member disposed at the opening of the gripping member in a slidable manner along the axis to switch between a first switching position and a second switching position, the driving direction switching member being formed protruding into the sliding and rotating space with a front limiting portion and a rear limiting portion behind the front limiting portion to define a sliding limitation space between the front limiting portion and the rear limiting portion, wherein the protruding portion protrudes into the sliding limitation space such that forward and backward sliding of the driving member in the sliding and rotating space is limited, wherein while the driving direction switching member is switched to the first switching position, operating conditions include:

(1) when the gripping member slides backwardly with respect to the screw shaft, the front stop-rotation portion of the gripping member backwardly engages the front engaging portion of the driving member, rendering the driving member unable to rotate to cause the driving member is unable to rotate with respect to the gripping member, and therefore the screw shaft is driven to rotate in a first rotation direction with respect to the gripping member by a screw mechanism between the screw threads and the driving threads of the driving member, and (2) when the gripping member slides forwardly with respect to the screw shaft, the front stop-rotation portion of the gripping member forwardly disengages from the front engaging portion of the driving member, and the rear engaging portion of the driving member is spaced apart from the rear stop-rotation portion of the gripping member by means of a rear limitation of the rear limiting portion of the driving direction switching member to the protruding portion, rendering the driving member rotatable, and therefore the driving member rotates with respect to the screw shaft but does not drive the screw shaft to rotate, the above two operating conditions enable the screw shaft to rotate only in the first rotation direction by a manual forward and backward sliding operation of the gripping member, wherein while the driving direction switching member is switched to the second switching position, operating conditions include:

(1) when the gripping member slides forwardly with respect to the screw shaft, the rear stop-rotation portion of the gripping member forwardly engages the rear engaging portion of the driving member, rendering the driving member unable to rotate to cause the driving member is unable to rotate with respect to the gripping member, and therefore the screw shaft is driven to rotate in a second rotation direction, which is opposite to the first rotating direction, with respect to the gripping member by the screw mechanism between the screw threads and the driving threads of the driving member, and (2) when the gripping member slides backwardly with respect to the screw shaft, the rear stop-rotation portion of the gripping member backwardly disengages from the rear engaging portion of the driving member, and the front engaging portion of the driving member is spaced apart from the front stop-rotation portion of the gripping member by means of a front limitation of the front limiting portion of the driving direction switching member to the protruding portion, rendering the driving member rotatable, and therefore the driving member rotates with respect to the screw shaft but does not drive the screw shaft to rotate, the above two operating conditions enable the screw shaft to rotate only in the second rotation direction by the manual forward and backward sliding operation of the gripping member.

2. The manual screw shaft driving device as claimed in claim 1, wherein the front engaging portion has front engaging ratchet teeth, and the front stop-rotation portion has front stop-rotation ratchet teeth, wherein the driving member is provided to be unable to rotate in the first rotation direction when the front engaging ratchet teeth and the front stop-rotation ratchet teeth are engaged.

3. The manual screw shaft driving device as claimed in claim 1, wherein the rear engaging portion has rear engaging ratchet teeth, and the rear stop-rotation portion has rear stop-rotation ratchet teeth, wherein the driving member is provided in a manner unable to rotate in the second rotation direction when the rear engaging ratchet teeth and the rear stop-rotation ratchet teeth are engaged.

4. The manual screw shaft driving device as claimed in claim 1, wherein the protruding portion is formed around the external surface of the driving member.

5. The manual screw shaft driving device as claimed in claim 1, wherein an outer front end of the gripping member is provided with a front holding portion and an outer rear end of the gripping member is provided with a rear holding portion, wherein the front holding portion and the rear holding portion have through holes formed coaxially along the axis, and the screw shaft is held by the through holes of the front holding portion and the rear holding portion to pass through the sliding and rotating space.

6. The manual screw shaft driving device as claimed in claim 1, wherein a rear end of the screw shaft is provided with a flange portion protruding from the outer peripheral surface of the screw shaft in a direction perpendicular to the axis, and when the gripping member slides backwardly with respect to the screw shaft, the screw shaft is prevented from coming off from the gripping member by the flange portion forwardly pressing against the gripping member.

7. The manual screw shaft driving device as claimed in claim 1, wherein an outer surface of the driving direction switching member is formed with a plurality of non-slip grooves.

* * * * *